United States Patent
Detig-Karlou et al.

(10) Patent No.: US 7,057,003 B2
(45) Date of Patent: *Jun. 6, 2006

(54) REACTIVE SYSTEMS, THEIR PREPARATION AND THEIR USE

(75) Inventors: Kamelia Detig-Karlou, Pullach (DE); Joachim Simon, Düsseldorf (DE); Michael Mager, Leverkusen (DE); Thomas Stingl, Montabaur (DE); Christoph Gürtler, Köln (DE); Michael Schelhaas, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,742

(22) Filed: Dec. 17, 2003

(65) Prior Publication Data

US 2004/0147704 A1  Jul. 29, 2004

(30) Foreign Application Priority Data

Dec. 20, 2002 (DE) ................................ 102 60 299

(51) Int. Cl.
*C08G 18/80* (2006.01)

(52) U.S. Cl. ........................ 528/45; 528/73; 428/423.1; 525/460; 525/528

(58) Field of Classification Search ................ 528/45, 528/73; 428/423.1; 525/460, 528
See application file for complete search history.

(56) References Cited

U.S. PATENT DOCUMENTS

| | | | |
|---|---|---|---|
| 3,931,116 A | 1/1976 | Bernstein et al. | 260/77.5 R |
| 3,993,708 A | 11/1976 | Brinkmann et al. | 260/830 P |
| 5,219,975 A | 6/1993 | Schmalstieg et al. | 528/45 |
| 6,060,573 A | 5/2000 | König et al. | 528/45 |
| 6,060,574 A | 5/2000 | Schmalstieg et al. | 528/45 |
| 6,583,216 B1 | 6/2003 | König et al. | 524/591 |
| 6,827,875 B1 * | 12/2004 | Schelhaas et al. | 252/182.2 |
| 6,843,933 B1 * | 1/2005 | Schelhaas et al. | 252/182.2 |
| 2003/0232199 A1 | 12/2003 | Rische et al. | 428/423.1 |
| 2003/0232907 A1 | 12/2003 | Rische et al. | 524/195 |
| 2003/0232953 A1 | 12/2003 | Gurtler et al. | 528/45 |
| 2004/0030086 A1 | 2/2004 | Schelhaas et al. | 528/45 |
| 2004/0132909 A1 * | 7/2004 | Weikard et al. | 525/126 |
| 2004/0133035 A1 * | 7/2004 | Greszta-Franz et al. | 560/330 |

FOREIGN PATENT DOCUMENTS

| | | |
|---|---|---|
| CA | 1 219 966 | 3/1987 |
| EP | 082 983 | 2/1987 |
| EP | 293 110 | 11/1988 |
| GB | 1 399 257 | 7/1975 |

* cited by examiner

*Primary Examiner*—Rachel Gorr
(74) *Attorney, Agent, or Firm*—Joseph C. Gil

(57) ABSTRACT

The invention relates to novel blocked polyurethane prepolymers, to a process for their preparation, to reactive systems prepared therefrom that cure at room temperature, and to their use.

17 Claims, No Drawings

REACTIVE SYSTEMS, THEIR
PREPARATION AND THEIR USE

CROSS REFERENCE TO RELATED PATENT
APPLICATION

The present patent application claims the right of priority under 35 U.S.C. §119 (a)–(d) of German Patent Application No.102 602 99.9, filed Dec. 20, 2002.

FIELD OF THE INVENTION

The invention relates to novel blocked polyurethane prepolymers, to a process for their preparation, to reactive systems prepared therefrom that cure at room temperature, and to their use.

BACKGROUND OF THE INVENTION

The polyamine/epoxy resin systems known from the state of the art are distinguished for example by excellent metal adhesion, very good chemical resistance and outstanding anticorrosive properties. In the case of solvent-containing formulations and powder coating systems, crosslinked films of high flexibility can be obtained by using epoxy resins with high molecular weights and/or polyaminoamides, e.g. based on dimeric fatty acids, as hardeners. Coatings based on solvent-free liquid resins and solvent-free amine hardeners are very brittle because of the low molecular weights of the epoxy resins and the resulting high network density. Tar substitutes such as coumarone resins, for example, are therefore used in solvent-free formulations as plasticizers. Especially when using relatively large amounts of hydrocarbon resins, such coatings tend towards long-term embrittlement as a result of migration of the non-functional constituents.

Epoxy resins can be given a good and permanent elasticity by combination with polyurethanes. Thus, for example, in DE-A 23 38 256, high-molecular polyether-urethaneureas with amino end groups were prepared by reacting prepolymers containing free isocyanate groups with amines in highly dilute solutions and then cured with epoxy resins. The use of the solvents, especially aromatic solvents, necessary for this purpose is a disadvantage in practice from both the technical and the physiological point of view. On the other hand, the viscosity of the solvent-free reaction products, such as those specifically prepared according to DE-A 23 38 256, is too high for practical applications.

DE-A 24 18 041 describes a process for the production of elasticized mouldings and sheet materials wherein epoxy compounds are reacted with amine compounds obtained by the hydrolysis of prepolymeric ketimines or enamines. Chemically resistant thermosetting moulding compounds with good adhesion and improved properties can be prepared by this process. The process described has the disadvantage of high process engineering costs.

DE-A 21 52 606 describes reactive systems based on alkylphenol-blocked polyisocyanates and polyamines that can optionally also be cured in combination with epoxy resins. Once again, these reactive systems are hampered by a few disadvantages relating to application technology. For example, they have a relatively high viscosity and the blocking agent released is of comparatively low molecular weight, so it migrates out of the coating over time and the adhesion of the coating to the substrate is no longer adequate.

To enable a specific reaction of polyisocyanate prepolymers with excess amounts of diamine, it was therefore proposed in many cases to use the polyisocyanates in blocked form, as described e.g. in CA 1-219 986, EP-A 293 110 or EP-A 082 983, where the preferred blocking agents used are phenols or substituted phenols. Following their reaction with the polyamines, the high boiling point of these substances is such that they can only be distilled from the reaction mixture incompletely, if at all. However, residues of the optionally substituted phenols in the mixtures or in the plastic compound lead to the disadvantages already described.

In EP-A 0 457 089, on the other hand, secondary amines preferably of low boiling point are used as blocking agents. Residues of these amines in the reaction mixture after deblocking readily create an odour nuisance. Although, in principle, the secondary amine used in epoxy systems can be incorporated into the system, this reaction proceeds relatively slowly, especially at low temperatures (e.g. room temperature), whereby part of the amines will leave the coating. In one particularly preferred application, the amine blocking agent is distilled from the reaction mixture after deblocking. Although this procedure yields products that do not create an odour nuisance, it is very involved and hence expensive.

U.S. Pat. No. 6,060,574 further discloses reactive compositions that consist of reversibly blocked organic polyisocyanates and at least one polyamine having at least two primary amino groups, and optionally also comprise a compound containing oxirane groups. Hydrocarbon resins with phenolic OH groups are used as blocking agents for the organic polyisocyanates. Polyisocyanates blocked in this way are distinguished by a markedly reduced reactivity towards polyamines, compared with alkylphenol-blocked polyisocyanates. The organic polyisocyanates used can be prepolymers obtained by reacting polyhydroxyl compounds with an excess of diisocyanates or polyisocyanates. Examples of polyhydroxyl compounds that can be used are polyetherpolyols obtainable by the alkoxylation of suitable starter molecules (e.g. monomeric polyols).

However, all the reversibly blocked polyurethane prepolymers described according to the state of the art and prepared by reacting a polyurethane prepolymer containing isocyanate groups with a blocking agent have the disadvantage that, after the reaction with a polyamine, the blocking agent is released again. The blocking agent is not chemically bonded in the plastic formed, so it can escape or be washed out over time, which is a great disadvantage in terms of the mechanical properties of the plastic.

Furthermore, the reversibly blocked polyurethane prepolymers known hitherto have a high viscosity due to intermolecular hydrogen bridging of the urethane groups, which is a great disadvantage for the processing of corresponding reactive systems with polyamines and optionally epoxides. Because of their high viscosity, such systems cannot usually be applied by spraying.

The object of the present invention was therefore to provide novel polyurethane prepolymers which have a markedly lower viscosity than the reversibly blocked polyurethane prepolymers known hitherto, and which, together with polyamines and optionally compounds containing oxirane groups, can be used in reactive systems that cure at room temperature, the blocking agent not being released when the reactive system cures (elimination-free systems).

SUMMARY OF THE INVENTION

The present invention is directed to polyurethane prepolymers which contain
I) alkylene oxide ether units and
II) structural units of formula (1):

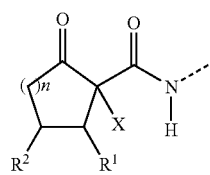

in which
X is an electron-withdrawing group,
R¹, and R² independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and
n is an integer from 0 to 5.

The present invention is also directed to a process for preparing the above-described polyurethane prepolymers. The process includes reacting
A) one or more polyisocyanates with
B) one or more polyetherpolyols,
C) optionally in the presence of one or more catalysts, after which the free NCO groups are reacted with
D) a blocking agent containing at least one CH-acidic cyclic ketone of formula (3):

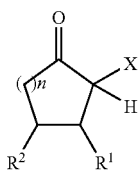

in which X, R¹, R² and are as above, and
E) optionally in the presence of one or more catalysts.

The present invention is further directed to a reactive system that includes
a) one or more polyurethane prepolymers as described above,
b) one or more organic compounds with at least 2 primary amino groups,
c) optionally one or more compounds containing oxirane groups with a mean oxirane functionality of greater than 1,
d) optionally catalysts and/or additives, and
e) optionally products resulting from reactions of components a) to d) with one another.

The present invention is additionally directed to a process for preparing the above-described reactive system including mixing above-described components a) to d) together in any order. The method can be used to make an adhesive, a sealing compound, a moulding or a coating composition.

The invention extends further to substrates coated with the compositions and mouldings obtained by the present method.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

As used herein, the term "functionality" and similar terms refers to the number of functional groups in a molecule. In other words and as a non-limiting example, a molecule with a functionality of greater than one contains more than one functional groups.

It has now been found that polyurethane prepolymers blocked with specific activated cyclic ketones have a considerably lower viscosity than prepolymers blocked according to the state of the art, and that no elimination of the blocking agent takes place after the reaction with polyamines (elimination-free systems).

The invention provides polyurethane prepolymers which contain
I) alkylene oxide ether units and
II) structural units of formula (1):

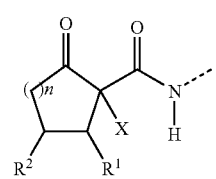

in which
X is an electron-withdrawing group,
R¹, R² independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and
n is an integer from 0 to 5.

Alkylene oxide ether units of the polyurethane prepolymers according to the invention are understood as meaning structures of formula (2):

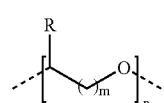

in which
R can be hydrogen or a $C_1$- to $C_{10}$-alkyl radical,
n can be 1 to 1000, and
m can be 1 to 3.

Preferably, R is hydrogen or a methyl group and n is 1 to 300.

The invention also provides a process for the preparation of the polyurethane prepolymers according to the invention, wherein
- A) one or more polyisocyanates are reacted with
- B) one or more polyetherpolyols,
- C) optionally in the presence of one or more catalysts, after which the free NCO groups are reacted with
- D) a blocking agent containing at least one CH-acidic cyclic ketone of general formula (3):

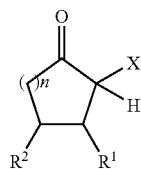

(3)

in which
- X is an electron-withdrawing group,
- $R^1$, $R^2$ independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and
- n is an integer from 0 to 5,
- E) optionally in the presence of one or more catalysts.

Suitable polyisocyanates as component A) are any of the known aliphatic, cycloaliphatic, aromatic or heterocyclic organic isocyanates, preferably diisocyanates or polyisocyanates with at least two isocyanate groups, and mixtures of said compounds. Examples of suitable aliphatic isocyanates are diisocyanates or triisocyanates, e.g. 1,4-butane diisocyanate, 1,5-pentane diisocyanate, 1,6-hexane diisocyanate (hexamethylene diisocyanate, HDI) and 4-isocyanatomethyl-1,8-octane diisocyanate (trisisocyanatononane, TIN), or cyclic systems, e.g. 4,4'-methylenebis(cyclohexyl isocyanate) (Desmodur® W, Bayer A G, Leverkusen), 3,5,5-trimethyl-1-isocyanato-3-isocyanatomethylcyclohexane (isophorone diisocyanate, IPDI) and ω,ω'-diisocyanato-1,3-dimethylcyclohexane ($H_6XDI$). Particularly suitable polyisocyanates are aromatic polyisocyanates, e.g. 1,5-naphthalene diisocyanate, diisocyanatodiphenylmethane (2,2'-, 2,4- and 4,4'-methylenediphenyl diisocyanate, MDI), especially the 4,4' isomer and technical-grade mixtures of the 2,4 and 4,4' isomers, diisocyanatomethylbenzene (2,4- and 2,6-toluylene diisocyanate, TDI), especially the 2,4 and 2,6 isomers and technical-grade mixtures of both isomers, and 1,3-bis(isocyanatomethyl)benzene (XDI).

A very particularly suitable aromatic diisocyanate is 2,4-toluylene diisocyanate and its technical-grade mixture containing 70 to 90% of 2,4-toluylene diisocyanate and 30 to 10% of 2,6-toluylene diisocyanate.

The secondary products of said isocyanates which have a biuret, isocyanurate, iminooxadiazinedione, uretdione, allophanate and/or urethane structure, known per se, are also suitable in terms of the invention.

Higher-molecular polyetherpolyols known per se from polyurethane chemistry, which are obtainable in a manner known per se by the alkoxylation of suitable starter molecules, are used as component B) of the process according to the invention for the preparation of the polyurethane prepolymers according to the invention.

Preferably, the polyetherpolyols used have number average molecular weights ranging from 300 to 20,000, preferably from 1000 to 12,000 and particularly preferably from 2000 to 6000.

Examples of suitable starter molecules are simple polyols, such as ethylene glycol, 1,2- or 1,3-propylene glycol, 1,4-butanediol, 1,6-hexanediol, neopentyl glycol, 2-ethyl-1,3-hexanediol, glycerol, trimethylolpropane, pentaerythritol and sorbitol, low-molecular hydroxyl group-containing esters of such polyols with aliphatic or aromatic dicarboxylic acids, and low-molecular ethoxylation or propoxylation products of such simple polyols, or any mixtures of such modified or unmodified alcohols, water, organic polyamines having at least two N—H bonds, or any mixtures of such starter molecules. Suitable compounds for the alkoxylation are cyclic ethers, such as tetrahydrofuran, and/or alkylene oxides, such as ethylene oxide, propylene oxide, butylene oxides or styrene oxide, or epichlorohydrin, especially ethylene oxide and/or propylene oxide, which can be used in the alkoxylation in any order or in a mixture.

Very particularly preferred polyetherpolyols with molecular weights ranging from 300 to 20,000, preferably from 1000 to 12,000 and particularly preferably from 2000 to 6000 are those whose content of unsaturated end groups is less than or equal to 0.02 milliequivalent per gram of polyol, preferably less than or equal to 0.015 milliequivalent per gram of polyol and particularly preferably less than or equal to 0.01 milliequivalent per gram of polyol (method of determination: ASTM D2849-69). The polyetherpolyols have a particularly narrow molecular weight distribution, i.e. a polydispersity (PD=$M_w/M_n$) of 1.1 to 1.5, and/or an OH functionality of $\geq 1.90$. Preferably, said polyetherpolyols have a polydispersity of 1.1 to 1.5 and an OH functionality of $\geq 1.9$, particularly preferably of $\geq 1.95$.

The polyetherpolyols with a content of unsaturated end groups less than or equal to 0.02 milliequivalent and a particularly narrow molecular weight distribution, i.e. a polydispersity of 1.1 to 1.5, and/or an OH functionality of $\geq 1.90$ can be prepared in a manner known per se by the alkoxylation of suitable starter molecules, especially using double metal cyanide catalysts (DMC catalysis). This is described e.g. in U.S. Pat. No. 5,158,922 (e.g. Example 30) and EP-A 0 654-302 (p. 5, 1.26top.6,1. 32).

Examples of these very particularly preferred polyetherpolyols are given in Table 1:

TABLE 1

|  | Acclaim® 1000 | Acclaim® 2200 | Acclaim® 3201 | Acclaim® 4200 | Acclaim® 6300 | Acclaim® 8200 |
|---|---|---|---|---|---|---|
| Physical data |  |  |  |  |  |  |
| Molecular weight | 1000 | 2000 | 3000 | 4000 | 6000 | 8000 |
| Functionality | 2 | 2 | 2 | 2 | 3 | 2 |
| Viscosity (25° C.) | 70 | 335 | 620 | 980 | 1470 | 3000 |
| Chemical data |  |  |  |  |  |  |
| OH number (mg KOH/g) | 112 | 56 | 37 | 28 | 28 | 14 |
| Proportion of double bonds (meq/g) | ≦0.0070 | ≦0.0070 | ≦0.0070 | ≦0.0070 | ≦0.0070 | ≦0.0070 |
| Acid number (mg KOH/g) | 0.02 | 0.02 | 0.018 | 0.018 | 0.02 | 0.02 |

All Acclaim® products are obtainable from Bayer AG, Leverkusen, DE.

The catalysts known per se from polyurethane chemistry for accelerating the NCO/OH reaction, especially metal-organic compounds such as tin(II) octoate, dibutyltin(II) diacetate or dibutyltin(II) dilaurate, or tertiary amines such as triethylamine or diazabicyclooctane, can be used as compounds of component C).

The blocking agents used in component D) are CH-acidic cyclic ketones of general formula (3):

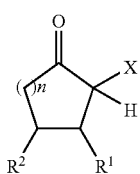

(3)

in which
X is an electron-withdrawing group,
$R^1$, $R^2$ independently of one another can be a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and can optionally be substituted by halogen atoms, and n is an integer from 0 to 5.

The electron-withdrawing group X can be any substituent that leads to a CH acidity of the a hydrogen. These can be e.g. ester groups, sulfoxide groups, sulfone groups, nitro groups, phosphonate groups, nitrile groups, isonitrile groups or carbonyl groups. Nitrile and ester groups are preferred and carboxylic acid methyl ester and carboxylic acid ethyl ester groups are particularly preferred.

Other suitable compounds of general formula (3) are those whose ring optionally contains heteroatoms such as oxygen, sulfur or nitrogen atoms, preference being given to the structural unit of a lactone. The activated cyclic system of formula (3) preferably has a ring size of 5 (n=1) or 6 (n=2).

Preferred compounds of general formula (3) are cyclopentanone-2-carboxymethyl ester and carboxyethyl ester, cyclopentanone-2-carbonitrile, cyclohexanone-2-carboxymethyl ester and carboxyethyl ester or cyclopentanone-2-carbonyl-methane. Cyclopentanone-2-carboxymethyl ester and carboxyethyl ester and cyclohexanone-2-carboxymethyl ester and carboxyethyl ester are particularly preferred.

Said CH-acidic cyclic ketones can of course be used in component D) either in mixtures with one another or in any mixtures with other blocking agents. Examples of other suitable blocking agents are alcohols, lactams, oximes, malonic acid esters, alkyl acetoacetates, triazoles, phenols, imidazoles, pyrazoles and amines, e.g. butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-methyl-, N-ethyl-, N-(iso)propyl-, N-n-butyl-, N-isobutyl- or N-tert-butyl-benzylamine or 1,1-dimethylbenzylamine, N-alkyl-N-1,1-dimethylmethylphenylamine, adducts of benzylamine with compounds having activated double bonds, such as malonic acid esters, N,N-dimethyl-aminopropyl-benzylamine and other optionally substituted benzylamines containing tertiary amino groups, and/or dibenzylamine, or any mixtures of these blocking agents. If they are used at all, the proportion of these other blocking agents of component D) that differ from CH-acidic cyclic ketones is up to 80 wt. %, preferably up to 40 wt. % and especially up to 20 wt. % of the total component D).

It is possible to use exclusively CH-acidic cyclic ketones of formula (3), especially cyclopentanone-2-carboxyethyl ester, as component D).

Alkali metal and alkaline earth metal bases, such as powdered sodium carbonate (soda) or trisodium phosphate, or amine bases, such as DABCO (1,4-diaza-bicyclo[2.2.2] octane), can be used as catalysts E) for the blocking reaction. The carbonates of metals of the second subgroup, and zinc salts, are also suitable. Preference is given to sodium carbonate, potassium carbonate or zinc 2-ethyl-hexanoate.

The content of free NCO groups in the polyisocyanate prepolymers according to the invention is preferably <1 wt. %, particularly preferably <0.1 wt. % and very particularly preferably <0.01 wt. %.

In the process according to the invention, component B) is reacted with excess amounts of the polyisocyanate component A), optionally in the presence of a catalyst C). Any unreacted polyisocyanate is then removed by distillation, e.g. film distillation. The molar ratio of OH groups in the polyetherpolyol component to NCO groups in the diisocyanate or polyisocyanate is preferably between 1:1.5 and 1:20, particularly preferably between 1:1.8 and 1:5 and very particularly preferably between 1:1.95 and 1:2.05.

The reaction of B) with A) generally takes place at temperatures of 0 to 250° C., preferably of 20 to 140° C. and particularly preferably of 40 to 100° C., optionally in the presence of a catalyst component C).

To prepare the products according to the invention, the resulting polyurethane prepolymers containing isocyanate groups are finally reacted with the blocking agent D) at temperatures of 0 to 250° C., preferably of 20 to 140° C. and particularly preferably of 40 to 100° C., optionally in the presence of suitable catalysts E).

The amount of blocking agent used shall be such that the equivalents of blocking agent groups suitable for isocyanate blocking correspond at least to 30 mol %, preferably to 50 mol % and particularly preferably to more than 95 mol % of the amount of isocyanate groups to be blocked. A slight excess of blocking agent may be advisable to ensure a complete reaction of all the isocyanate groups. As a rule the excess is not more than 20 mol %, preferably not more than 15 mol % and particularly preferably not more than 10 mol %, based on the isocyanate groups to be blocked. Very particularly preferably, the amount of blocking agent groups suitable for NCO blocking is therefore 95 mol % to 110 mol %, based on the amount of polyurethane prepolymer isocyanate groups to be blocked.

In the process according to the invention, 0.001 to 10 wt. %, preferably 0.005 to 5 wt. % and particularly preferably 0.005 to 0.1 wt. % of catalyst is added, based on the total reaction mixture.

In general, one or more organic solvents inert under the process conditions can be introduced at any time during the preparation of the polyisocyanates according to the invention. The products according to the invention are preferably prepared without additional solvents.

In one embodiment of the process according to the invention, component B) is placed in a suitable reaction vessel and heated to 40 to 100° C., optionally with stirring. When the desired temperature has been reached, the polyisocyanate component A) is added, with stirring, and stirring is continued until the theoretical NCO content of the polyurethane prepolymer to be expected according to the chosen stoichiometry has been reached or very nearly reached. To accelerate the subsequent blocking reaction, a suitable catalyst E), e.g. zinc(II) 2-ethylhexanoate, is then added, the temperature of the reaction mixture optionally being adjusted to a value of between 50 and 100° C. before or after the addition of the catalyst. When the desired temperature has been reached, the blocking agent D) is added and the reaction mixture is heated until the content of free isocyanate groups is less than 0.5 wt. %, preferably less than 0.2 wt. % and particularly preferably less than 0.1 wt. %. The reaction mixture is then cooled and a reaction stopper, e.g. benzoyl chloride, is optionally added.

In another embodiment of the process according to the invention for the preparation of the prepolymers, the polyisocyanate component A) is placed in a suitable reaction vessel and heated to 40 to 100° C., optionally with stirring. When the desired temperature has been reached, component B) is added, with stirring, and stirring is continued until the theoretical NCO content of the polyurethane prepolymer to be expected according to the chosen stoichiometry has been reached or very nearly reached. The reaction is then continued as already described.

The invention also provides reactive systems containing
 a) one or more polyurethane prepolymers according to the invention,
 b) one or more organic compounds with at least 2 primary amino groups,
 c) optionally one or more compounds containing oxirane groups with a mean oxirane functionality of >1,
 d) optionally catalysts and/or additives, and
 e) optionally products resulting from reactions of components a) to d) with one another, and a process for their preparation.

The amines of component b) are polyamines having at least two primary amino groups per molecule and optionally also secondary amino groups, and an average molecular weight preferably of 60 to 500. Examples of suitable polyamines are ethylenediamine, 1,2- and 1,3-diaminopropane, 1,4-diaminobutane, 2,2,4- and/or 2,4,4-trimethylhexamethylenediamine, the isomeric xylylenediamines, 1,4-diaminocyclohexane, 4,4'-diaaminodicyclohexylmethane, 1,3-diamino-cyclopentane, 4,4'-diaminodicyclohexyl sulfone, 1,3-bis(4-aminocyclo-hexyl)propane, 2,2-bis(4-aminocyclohexyl)propane, 3,3'-dimethyl-4,4'-diaminodicyclohexylmethane, 3-amino-methyl-3,3,5-trimethylcyclohexylamine (isophoronediamine), 3(4)-aminomethyl-1-methylcyclohexylamine, technical-grade bisaminomethyltricyclo-decane and octahydro-4.7-methanoindene-1.5-dimethanamine, or polyamines having secondary amino groups in addition to at least two primary amino groups, for example diethylenetriamine or triethylene-tetramine.

Particular preference is given to polyamines, especially diamines in said molecular weight range, which have one or more cycloaliphatic rings. These include e.g. 1,4-diaminocyclohexane, 4,4'-diaminodicyclohexylmethane, 1,3-diamino-cyclopentane, 4,4'-diaminodicyclohexyl sulfone, 1,3-bis(4-aminocyclo-hexyl)propane, 2,2-bis(4-aminocyclohexyl)propane, 3,3'-dimethyl-4,4'-diaminodicyclohexylmethane, 3-aminomethyl-3,3,5-trimethylcyclohexylamine (isophoronediamine), 3- and 4-aminomethyl-1-methylcyclohexylamine or technical-grade bisaminomethyltricyclodecane.

Other constituents that can be used in the amine component are adducts prepared by reacting an excess of said polyamines with epoxy resins of the type mentioned below.

Other constituents that can be used in component b) are polyetheramines prepared by reacting polyetherpolyols with ammonia and marketed e.g. by Huntsman under the trade name Jeffamin®.

Polyamide resins are also suitable constituents of component b). Such polyamide resins, which include polyaminoamides and polyaminoimidazolines, are marketed inter alia by Henkel KGaA under the trade name Versamid®.

Of course, it is also possible to use mixtures of said polyamines as the amine component b).

Compounds in the epoxy component c) are epoxy resins containing on average more than one epoxy group per molecule. Examples of suitable epoxy resins are glycidyl ethers of polyhydric alcohols such as butanediol, hexanediol, glycerol or hydrogenated diphenylolpropane, or polyhydric phenols such as resorcinol, 2,2-diphenylolpropane (bisphenol A) or diphenylolmethane (bisphenol F), or phenol/aldehyde condensation products. It is also possible to use glycidyl esters of polybasic carboxylic acids such as hexahydrophthalic acid or dimerized fatty acid.

It is particularly preferable to use liquid epoxy resins based on epichlorohydrin and 2,2-diphenylolpropane (bisphenol A) or diphenylolmethane (bisphenol F), or mixtures thereof. If desired, monofunctional epoxy compounds can be used to reduce the viscosity of the mixtures and hence improve the processing. Examples of these compounds are aliphatic and aromatic glycidyl ethers such as butyl glycidyl ether or phenyl glycidyl ether, glycidyl esters such as versatic acid glycidyl ester, or epoxides such as styrene oxide or 1,2-epoxydodecane. The solvent-free reactive systems according to the invention that cure at room temperature generally contain 0.4 to 0.9 and preferably 0.5 to 0.8 primary amino groups in component b) and 0.02 to 0.6 and preferably 0.03 to 0.5 blocked isocyanate groups in component a) per epoxy group in component c).

For the preparation of ready-to-use mixtures, the reactive systems according to the invention can incorporate the conventional auxiliary substances and additives, for example fillers, solvents, flow control agents, pigments, reaction accelerators or viscosity regulators. Examples which may be mentioned are reaction accelerators such as salicylic acid, bis(dimethylaminomethyl)phenol or tris(dimethylamino-methyl)phenol, fillers such as sand, crushed rock, silicic acid, asbestos flour, kaolin, talcum, powdered metal, tar, tar pitch, asphalt, granulated cork or polyamide, plasticizers such as phthalic acid esters, or other viscosity regulators such as benzyl alcohol.

Of course, optionally up to 20 wt. %, preferably up to 10 wt. % and particularly preferably up to 5 wt. % of a solvent or lacquer solvent of the type already mentioned can be added to the ready-to-use mixture for application engineering purposes. If solvents are to be used at this point, it is possible to dispense with the removal of any solvents that may have been used during the synthesis of the polyurethane prepolymers according to the invention.

In terms of the present invention, however, solvent-free ready-to-use reactive systems are very particularly preferred.

In the process according to the invention for the preparation of the reactive systems, component a) is mixed with component b) in either order, preferably with stirring. Components c) and d) can then be added, likewise in either order and again optionally with stirring.

The reactive systems according to the invention consisting of a) and b) and optionally c) and/or d) are prepared at temperatures preferably of −20° C. to 50° C., particularly preferably of 0° C. to 40° C.

The polyisocyanates according to the invention and the reactive systems are suitable for the production of coatings, adhesives, sealing compounds, casting compounds or mouldings in all fields of application that demand good adhesion, chemical resistance and high impact strength coupled with good flexibility, and elasticity. The systems according to the invention are particularly suitable as anticorrosive coatings. Particularly in the case of coatings attacked by aggressive media, for example ballast tank coatings, the systems are distinguished by a good wet adhesion and a good adhesion under conditions of cathode protection.

The reactive systems according to the invention can be used on a very wide variety of substrates. Examples which may be mentioned are mineral substrates, e.g. those made of concrete and/or stone, metal substrates, e.g. those made of iron, steel, copper, brass, bronze, aluminium or titanium, as well as alloys of said metals, and plastics, for example in the form of already existing coatings on e.g. said metal or mineral substrates.

The reactive systems according to the invention can be applied to the surface to be coated by e.g. pouring, brushing, dipping, spraying, flow coating, knife coating or rolling. Depending on the field of application, it is thus possible to obtain layer thicknesses of 10 μm (e.g. for thin anticorrosive coatings) up to several centimetres (e.g. for crack-filling casting compounds).

Depending on the chosen composition of the reactive systems according to the invention, they cure under ambient conditions, i.e. at temperatures preferably of −30° C. to 50° C. and at a relative humidity preferably of 10% to 90%, within a few minutes to a few days. By raising the temperature, i.e. above said 50° C., it is further possible to force the curing, which may also be desirable in practice.

EXAMPLES

Preliminary Remark:

Unless indicated otherwise, all percentages are by weight (wt. %).

The polyetherpolyols used in the Examples for the preparation of the blocked polyurethane prepolymers according to the invention are obtainable e.g. from Bayer A G, Leverkusen, Germany, and are characterized by the following parameters:

TABLE 2

|  | Acclaim ® 1000 | Acclaim ® 2200 | Acclaim ® 3201 | Acclaim ® 4200 |
| --- | --- | --- | --- | --- |
| Physical data |  |  |  |  |
| Molecular weight | 1000 | 2000 | 3000 | 4000 |
| OH functionality | 2 | 2 | 2 | 2 |
| Viscosity (25° C.) | 70 | 335 | 620 | 980 |
| Chemical data |  |  |  |  |
| OH number (mg KOH/g) | 112 | 56 | 37 | 28 |
| Content of unsaturated end groups (meq/g) | ≦0.0070 | ≦0.0070 | ≦0.0070 | ≦0.0070 |
| Acid number (mg KOH/g) | 0.02 | 0.02 | 0.018 | 0.018 |

D.E.R 358 is a liquid epoxy resin based on bisphenol A and bisphenol F, with an epoxy equivalent of 170–180 and a corresponding epoxy content of 23.9–25.3% (both values according to ASTM D-1652), obtainable from Dow Plastics, Midland, USA. Perenol® E 8 is an antibubble agent and defoamer obtainable from Cognis GmbH & Co. K G, Duisseldorf, D E, and Laromin® C 260 [bis(4-amino-3-methylcyclohexyl)methane] is obtainable from BASF A G, Ludwigshafen, D E.

Example 1

852.58 g (0.43 g equiv.) of the polyether Acclaim® 4200 (Bayer A G, OH number: 28 [mg KOH/g]) were placed in a 2 litre four-neck flask with reflux condenser, in a nitrogen atmosphere, and heated to 60° C. 74.17 g (0.85 g equiv.) of 2,4-toluylene diisocyanate (Bayer A G, Leverkusen) were then run in rapidly at 60° C. via a metering funnel. Stirring was continued until the NCO content had reached 1.93%. 1 g of zinc 2-ethylhexanoate was then added to the mixture, followed by 73.25 g (0.47 g equiv.) of cyclopentanone-2-carboxyethyl ester. The resulting mixture was then stirred at a temperature of 50° C. until the NCO content was less than 0.1% (approx. 4 hours). The blocked isocyanate prepolymer obtained showed the following parameters:

| | |
|---|---|
| blocked NCO content: | 1.79% |
| viscosity (23° C.): | 19,000 mPas |

Example 2 a) 743.04 g (0.743 g equiv.) of the polyether Acclaim® 2200 (Bayer A G, OH number: 56 [mg KOH/g]) were placed in a 2 litre four-neck flask with reflux condenser, in a nitrogen atmosphere, and heated to 60° C. 129.29 g (1.5 g equiv.) of 2,4-toluylene diisocyanate (Bayer A G, Leverkusen) were then run in rapidly at 60° C. via a metering fnnnel. Stirring was continued until the NCO content had reached 3.58%. 1 g of zinc 2-ethylhexanoate was then added to the mixture, followed by 127.67 g (0.81 g equiv.) of cyclopentanone-2-carboxyethyl ester. The resulting mixture was then stirred at a temperature of 50° C. until the NCO content was less than 0.2% (approx. 4 hours). The blocked isocyanate prepolymer obtained showed the following parameters:

| | |
|---|---|
| blocked NCO content: | 3.12% |
| viscosity (23° C.): | 23,700 mPas | b) 20 g of the prepolymer from a) were intimately stirred with 6.82 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture was poured out in a layer thickness of 3 mm. After a few hours, a transparent, highly elastic plastic with the following mechanical parameters was obtained:

| | |
|---|---|
| stress at break: | 20.1 MPa |
| elongation at break: | 55.9% extension |
| resistance to tear propagation: | 38.9 N/mm |

Example 3 a) 591.14 g (1.18 g equiv.) of the polyether Acclaim® 1000 (Bayer A G, OH number: 112 [mg KOH/g]) were placed in a 2 litre four-neck flask with reflux condenser, in a nitrogen atmosphere, and heated to 60° C. 205.72 g (2.36 g equiv.) of 2,4-toluylene diisocyanate (Bayer A G, Leverkusen) were then run in rapidly at 60° C. via a metering funnel. Stirring was then continued until the NCO content had reached 6.23%. 1 g of zinc 2-ethylhexanoate was then added to the mixture, followed by 203.14 g (1.3 g equiv.) of cyclopentanone-2-carboxyethyl ester. The resulting mixture was then stirred at a temperature of 50° C. until the NCO content was less than 0.2% (approx. 4 hours). The blocked isocyanate prepolymer obtained showed the following parameters:

| | |
|---|---|
| blocked NCO content: | 4.97% |
| viscosity (23° C.): | 115,000 mPas | b) 20 g of the prepolymer from a) were intimately stirred with 7.33 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture was poured out in a layer thickness of 3 mm. After 24 hours, a transparent, highly elastic plastic was obtained with a Shore A and Shore D hardness of 92 and 60 respectively.

Example 4 a) 812.65 g (0.54 g equiv.) of the polyether Acclaim® 3201 (Bayer A G, OH number: 37 [mg KOH/g]) were placed in a 2 litre four-neck flask with reflux condenser, in a nitrogen atmosphere, and heated to 60° C. 94.27 g (1.08 g equiv.) of 2,4-toluylene diisocyanate (Bayer A G, Leverkusen) were then run in rapidly at 60° C. via a metering funnel. Stirring was then continued until the NCO content had reached 2.51%. 1 g of zinc 2-ethylhexanoate was then added to the mixture, followed by 93.09 g (0.6 g equiv.) of cyclopentanone-2-carboxyethyl ester. The resulting mixture was then stirred at a temperature of 50° C. until the NCO content was less than 0.2% (approx. 4 hours). The blocked isocyanate prepolymer obtained showed the following parameters:

| | |
|---|---|
| blocked NCO content: | 2.28% |
| viscosity (23° C.): | 15,200 mPas | b) 20 g of the prepolymer from a) were intimately stirred with 6.70 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture was poured out in a layer thickness of 3 mm. After a few hours, a transparent, highly elastic plastic with the following mechanical parameters was obtained:

| | |
|---|---|
| stress at break: | 19.9 MPa |
| elongation at break: | 56.9% extension |
| resistance to tear propagation: | 29.6 N/mm |

Example 5 a) 786.64 g (0.62 g equiv.) of a polyetherpolyol with an OH number of 42 (mg KOH/g), prepared by the base-catalyzed simultaneous ethoxylation and propoxylation (EO/PO ratio=2:8) of a 2:1 mixture of propylene glycol and glycerol, were placed in a 2 litre four-neck flask with reflux condenser, in a nitrogen atmosphere, and heated to 60° C. 107.35 g (1.23 g equiv.) of 2,4-toluylene diisocyanate (Bayer A G, Leverkusen) were then run in rapidly at 60° C. via a metering funnel. Stirring was then continued until the NCO content had reached 2.90%. 1 g of zinc 2-ethylhexanoate was then added to the mixture, followed by 106.01 g (0.68 g equiv.) of cyclopentanone-2-carboxyethyl ester. The resulting mixture was then stirred at a temperature of 50° C. until the NCO content was less than 0.2% (approx. 4 hours). The blocked isocyanate prepolymer obtained showed the following parameters:

| blocked NCO content: | 2.59% |
|---|---|
| viscosity (23° C.): | 29,900 mPas | b) 20 g of the prepolymer from a) were intimately stirred with 6.75 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture was poured out in a layer thickness of 3 mm. After a few hours, a transparent, highly elastic plastic with the following mechanical parameters was obtained:

| stress at break: | 17.8 MPa |
|---|---|
| elongation at break: | 41.2% extension |
| resistance to tear propagation: | 37.7 N/mm |

Example 6 a) 845.6 g (0.45 g equiv.) of a mixture of linear polyetherpolyols (OH number: 28 [mg KOH/g]), consisting of 55% of a linear polyetherpolyol obtained by the ethoxylation and propoxylation (EO/PO ratio=1:3) of propylene glycol, and 45% of a linear polyetherpolyol obtained by the ethoxylation and propoxylation (EO/PO ratio=1:6) of propylene glycol, were placed in a 2 litre four-neck flask with reflux condenser, in a nitrogen atmosphere, and heated to 60° C. 77.68 g (0.9 g equiv.) of 2,4-toluylene diisocyanate (Bayer A G, Leverkusen) were then run in rapidly at 60° C. via a metering funnel. Stirring was then continued until the NCO content had reached 2.03%. 1 g of zinc 2-ethylhexanoate was then added to the mixture, followed by 76.71 g (0.49 g equiv.) of cyclopentanone-2-carboxyethyl ester. The resulting mixture was then stirred at a temperature of 50° C. until the NCO content was less than 0.2% (approx. 4 hours). The blocked isocyanate prepolymer obtained showed the following parameters:

| blocked NCO content: | 1.88% |
|---|---|
| viscosity (23° C.): | 15,600 mPas | b) 20 g of the prepolymer from a) were intimately stirred with 6.59 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture was poured out in a layer thickness of3 mm. After a few hours, a very slightly hazy, highly elastic plastic with the following mechanical parameters was obtained:

| stress at break: | 18.7 MPa |
|---|---|
| elongation at break: | 60.5% extension |
| resistance to tear propagation: | 26.4 N/mm |

Example 7

10 g of each of the blocked polyurethane prepolymers prepared according to Examples 1–6 were mixed with 0.05 g of Perenol® E 8 and 0.05 g of 2,3-dimethyl-3,4,5,6-tetrahydropyrimidine, with stirring. Laromin® C 260 was then added in the amounts indicated in Table 3, with stirring, and the reactive mixture was then left to stand for 3 days at ambient temperature. Transparent, homogeneous, well-cured and elastic plastics were obtained in all cases, i.e. with all the amounts of Laromin® C 260 described.

TABLE 3

| blocked polyurethane prepolymer of Example | Laromin ® C 260 | | |
|---|---|---|---|
| | amount 1 [g] | amount 2 [g] | amount 3 [g] |
| 1 | 0.4 | 0.6 | 0.8 |
| 2 | 0.6 | 0.8 | 1.2 |
| 3 | 1.6 | 2.0 | 2.4 |
| 4 | 0.6 | 0.8 | 1.2 |
| 5 | 0.6 | 0.8 | 1.2 |
| 6 | 0.6 | 0.8 | 1.2 |

Example 8

283.5 g (0.04 g equiv.) of the polyether Acclaim® 8200 (Bayer A G, Leverkusen, O H number: 15.8 [mg KOH/g]) were placed in a 500 ml three-neck flask with reflux condenser, in a nitrogen atmosphere, and heated to 60° C. 13.9 g (0.08 g equiv.) of 2,4-toluylene diisocyanate (Bayer A G, Leverkusen) were then run in rapidly at 60° C. via a metering funnel. Stirring was then continued until the NCO content had reached 1.13%. 93 mg of zinc tetramethylheptadionate were then added to the mixture, followed by 12.5 g (0.08 g equiv.) of cyclopentanone-2-carboxyethyl ester. The resulting mixture was then stirred at a temperature of 50° C. until-the NCO content was less than 0.2% (approx. 22 hours).

| blocked NCO content: | 1.08% |
|---|---|
| viscosity (23° C.): | 31,000 mPas |

Example 9

112 g (0.01 g equiv.) of the polyether Acclaim® 12200 (Bayer A G, Leverkusen, O H number: 10.0 [mg KOH/g]) were placed in a 250 ml three-neck flask with reflux condenser, in a nitrogen atmosphere, and heated to 60° C. 3.5 g (0.02 g equiv.) of 2,4-toluylene diisocyanate (Bayer A G, Leverkusen) were then run in rapidly at 60° C. via a metering funnel. Stirring was then continued until the NCO content had reached 0.73%. 59 mg of zinc acetylacetonate were then added to the mixture, followed by 3.1 g (0.01 g equiv.) of cyclopentanone-2-carboxyethyl ester. The resulting mixture was then stirred at a temperature of 50° C. until the NCO content was less than 0.2% (approx. 22 hours).

| blocked NCO content: | 0.71% |
|---|---|
| viscosity (23° C.): | 103,000 mPas |

Example 10

100 g (0.1 g equiv.) of the polyether Acclaim® 2200 (Bayer A G, Leverkusen, O H number: 55.9 [mg KOH/g])

.were placed in a 250 ml three-neck flask with reflux condenser, in a nitrogen atmosphere, and heated to 60° C. 17.4 g (0.05 g equiv.) of 2,4-toluylene diisocyanate (Bayer A G, Leverkusen) were then run in rapidly at 60° C. via a metering funnel. Stirring was then continued until the NCO content had reached 3.58%. 70 mg of zinc 2-ethylhexanoate were then added to the mixture, followed by 18.7 g (0.12 g equiv.) of cyclohexanone-2-carboxyethyl ester. The resulting mixture was then stirred at a temperature of 50° C. until the NCO content was less than 0.2% (approx. 16 hours).

| blocked NCO content: | 3.13% |
|---|---|
| viscosity (23° C.): | 17,700 mPas |

Example 11

989.4 g (0.25 g equiv.) of the polyether Acclaim® 4200 (Bayer A G, Leverkusen, O H number: 28.3 [mg KOH/g]) were placed in a 2 l three-neck flask with reflux condenser, in a nitrogen atmosphere, and heated to 60° C. 87 g (0.5 g equiv.) of 2,4-toluylene diisocyanate (Bayer A G, Leverkusen) were then run in rapidly at 60° C. via a metering funnel. Stirring was then continued until the NCO content had reached 1.95%. 215.4 g (0.1 g equiv.) of the resulting amount of prepolymer were taken and reacted in another flask with 18.7 g of cyclohexanone-2-carboxyethyl ester (0.11 g equiv.) in which 350 mg of zinc acetylacetonate had previously been suspended. The resulting mixture was then stirred at a temperature of 50° C. until the NCO content was less than 0.2% (approx. 30 hours).

| blocked NCO content: | 1.68% |
|---|---|
| viscosity (23° C.): | 32,000 mPas |

Example 12

25.5 g (0.15 g equiv.) of cyclohexanone-2-carboxyethyl ester were added slowly to 180 g (0.15 g equiv.) of Desmodur® E 14 (isocyanate-functional polyurethane prepolymer from Bayer A G, Leverkusen, NCO content: 3.3 wt. %, viscosity: 6800 mpas, equivalent weight: approx. 1270) and 0.206 g of zinc 2-ethylhexanoate in a 250 ml three-neck flask with reflux condenser, in a nitrogen atmosphere. 28.2 g of methoxypropyl acetate and 59.9 g of xylene were used as solvents. The NCO content had reached 0.8% after 20 hours. 14.4 g of 2-butanol were also added.

| blocked NCO content: | 2.89% |
|---|---|

Example 13

10 g of each of the blocked polyurethane prepolymers prepared according to Examples 8–12 were mixed with 0.05 g of Perenol® E 8 and 0.05 g of 2,3-dimethyl-3,4,5,6-tetrahydropyrimidine, with stirring. Laromin® C 260 was then added in the amounts indicated in Table 4, with stirring, and the reactive mixture was then left to stand for 3 days at ambient temperature. Transparent, homogeneous and elastic plastics were obtained in all cases, i.e. with all the amounts of Laromin® C 260 described.

TABLE 4

| blocked polyurethane prepolymer of Example | Laromin ® C 260 | | |
|---|---|---|---|
| | amount 1 [g] | amount 2 [g] | amount 3 [g] |
| 8 | 0.4 | 0.6 | 0.8 |
| 9 | 0.4 | 0.6 | 0.8 |
| 10 | 0.4 | 0.6 | 0.8 |
| 11 | 0.4 | 0.6 | 0.8 |
| 12 | 0.4 | 0.6 | 0.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyurethane prepolymers which contain
   I) alkylene oxide ether units and
   II) structural units of formula (1):

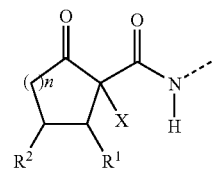

(I)

in which
   X is an electron-withdrawing group,
   $R^1$, and $R^2$ independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and
   n is an integer from 0 to 5.

2. The polyurethane prepolymers according to claim 1, wherein the electron-withdrawing group X is selected from the group consisting of an ester, a sulfoxide, a sulfone, a nitro, a phosphonate, a nitrile, an isonitrile and a carbonyl group.

3. A process for preparing the polyurethane prepolymers according to claim 1, comprising reacting
   A) one or more polyisocyanates with
   B) one or more polyetherpolyols,
   C) optionally in the presence of one or more catalysts, after which the free NCO groups are reacted with
   D) a blocking agent containing at least one CH-acidic cyclic ketone of formula (3):

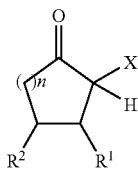

in which

X is an electron-withdrawing group,

R¹, and R² independently of one another are a hydrogen atom, a saturated or unsaturated aliphatic or cycloaliphatic radical or an optionally substituted aromatic or araliphatic radical, which radicals in each case contain up to 12 carbon atoms and optionally up to 3 heteroatoms selected from the elements oxygen, sulfur and nitrogen, and are optionally substituted by halogen atoms, and n is an integer from 0 to 5, and E) optionally in the presence of one or more catalysts.

4. The process according to claim 3, wherein the electron-withdrawing group X of the CH-acidic cyclic ketone of formula (3) is selected from the group consisting of an ester, a sulfoxide, a sulfone, a nitro, a phosphonate, a nitrile, an isonitrile and a carbonyl group.

5. A reactive system comprising
a) one or more polyurethane prepolymers according to claim 1,
b) one or more organic compounds with at least 2 primary amino groups,
c) optionally one or more compounds containing oxirane groups with a mean oxirane functionality of greater than 1,
d) optionally catalysts and/or additives, and
e) optionally products resulting from reactions of components a) to d) with one another.

6. A process for preparing the reactive systems according to claim 5 comprising mixing components a) to d) together in any order.

7. A method of making an adhesive, a sealing compound, a moulding or a coating composition comprising mixing components a) to d) of claim 5 together in any order.

8. Substrates coated with compositions according to claim 7.

9. Mouldings obtained according to claim 7.

10. The process of claim 3, wherein the polyisocyanates of A) are one or more selected from the group consisting of 1,4-butane diisocyanate, 1,5-pentane diisocyanate, 1,6-hexamethylene diisocyanate, trisisocyanatononane, 4,4'-methylenebis(cyclohexyl isocyanate), isophorone diisocyanate, ω,ω'-diisocyanato-1,3-dimethylcyclohexane, 1,5-naphthalene diisocyanate, 2,2'-methylenediphenyl diisocyanate, 2,4-methylenediphenyl diisocyanate, 4,4'-methylenediphenyl diisocyanate, 2,4-toluylene diisocyanate, 2,6-toluylene diisocyanate, and 1,3-bis(isocyanatomethyl)benzene.

11. The process of claim 3, wherein the polyetherpolyols B) have a number average molecular weight of from 300 to 20,000.

12. The process of claim 3, wherein the catalyst C) is selected from the group consisting of tin(II) octoate, dibutyltin(II) diacetate, dibutyltin(II) dilaurate, triethylamine, diazabicyclooctane and mixtures thereof.

13. The process of claim 3, wherein the CH-acidic cyclic ketones of formula (3) are selected from the group consisting of cyclopentanone-2-carboxymethyl ester, cyclopentanone-2-carboxyethyl ester, cyclopentanone-2-carbonitrile, cyclohexanone-2-carboxymethyl ester, cyclohexanone-2-carboxyethyl ester, cyclopentanone-2-carbonylmethane and mixtures thereof.

14. The reactive system of claim 5, wherein the amines of component b) are selected from the group consisting of polyamines having at least two amino groups per molecule, wherein the amino groups are primary or secondary amino groups.

15. The reactive system of claim 5, wherein the amines of component b) have a molecular weight preferably of from 60 to 500.

16. The reactive system of claim 5, wherein the amines of component b) are selected from the group consisting of ethylenediamine, 1,2-diamino-propane, 1,3-diaminopropane, 1,4-diaminobutane, 2,2,4-trimethyl-hexamethylenediamine, 2,4,4-trimethylhexamethylenediamine, the isomeric xylylenediamines, 1,4-diaminocyclohexane, 4,4'-diaminodicyclohexylmethane, 1,3-diamino-cyclopentane, 4,4'-diaminodicyclohexyl sulfone, 1,3-bis(4-aminocyclo-hexyl)propane, 2,2-bis(4-aminocyclohexyl)propane, 3,3'-dimethyl-4,4'-diaminodicyclo-hexylmethane, isophoronediamine, 3(4)-aminomethyl-1-methyl-cyclohexylamine, bisaminomethyltricyclo-decane, octahydro-4.7-methanoindene-1,5-dimethanamine, diethylenetriamine, triethylenetetramine 1,4-diaminocyclo-hexane, 4,4'-diaminodicyclohexylmethane, 1,3-diaminocyclopentane, 4,4'-diaminodicyclohexyl sulfone, 1,3-bis(4-aminocyclohexyl) propane, 2,2-bis(4-aminocyclo-hexyl)propane, 3,3'-dimethyl-4,4'-diaminodicyclohexylmethane, 3-aminomethyl-3,3,5-trimethylcyclohexylamine (isophoronediamine), 3-aminomethyl-1-methylcyclohexylamine, 4-aminomethyl-1-methylcyclo-hexylaamine, bisaminomethyltricyclodecane, polyetheramines, and mixtures thereof.

17. The polyurethane prepolymers according to claim 1, wherein the alkylene oxide ether units I) include those described by formula (2):

in which

R is selected from hydrogen and a $C_1$- to $C_{10}$-alkyl radical, n is from 1 to 1000, and m is from 1 to 3.

* * * * *